United States Patent
Bhandary (10) Patent No.: US 11,099,552 B2
(45) Date of Patent: Aug. 24, 2021

(54) METHOD AND SYSTEM FOR ACCELERATING CONVERGENCE OF RECURRENT NEURAL NETWORK FOR MACHINE FAILURE PREDICTION

(71) Applicant: AVANSEUS HOLDINGS PTE. LTD., Singapore (SG)

(72) Inventor: Chiranjib Bhandary, Bangalore (IN)

(73) Assignee: Avanseus Holdings Pte. Ltd., Bugis Junction (SG)

( * ) Notice: Subject to any disclaimer, the term of this patent is extended or adjusted under 35 U.S.C. 154(b) by 226 days.

(21) Appl. No.: 16/403,675

(22) Filed: May 6, 2019

(65) Prior Publication Data

US 2020/0319631 A1 Oct. 8, 2020

(51) Int. Cl.
G05B 23/02 (2006.01)
G06N 3/08 (2006.01)
G06N 20/00 (2019.01)

(52) U.S. Cl.
CPC ....... *G05B 23/0283* (2013.01); *G05B 23/024* (2013.01); *G05B 23/0205* (2013.01); *G06N 3/08* (2013.01); *G06N 20/00* (2019.01)

(58) Field of Classification Search
CPC ............ G05B 23/0283; G05B 23/0205; G05B 23/024; G06N 20/00; G06N 3/08
See application file for complete search history.

(56) References Cited

U.S. PATENT DOCUMENTS

2021/0002728 A1* 1/2021 Landau .................. G16B 30/00

FOREIGN PATENT DOCUMENTS

IN 201611037626 * 4/2018 ............... B60K 1/04

* cited by examiner

*Primary Examiner* — Catherine T. Rastovski
*Assistant Examiner* — Aeysha N Sultana
(74) *Attorney, Agent, or Firm* — Renner, Otto, Boisselle & Sklar, LLP (57) ABSTRACT

Embodiments of the invention provide a method and system for accelerating convergence of Recurrent Neural Network (RNN) for machine failure prediction. The method comprises: setting initial parameters in RNN wherein the initial parameters include an initial learning rate which is determined based on a standard deviation of a plurality of basic memory depth values identified from a machine failure sequence; training RNN based on the initial parameters and at the end of each predetermined time period, calculating current pattern error based on a vector distance between the machine failure sequence and current predicted sequence; and if the current pattern error is less than or not greater than a predetermined error threshold value, determining, by the processor, an updated learning rate based on the current pattern error, and updating weight values between input and hidden units in RNN based on the updated learning rate.

18 Claims, 5 Drawing Sheets

METHOD AND SYSTEM FOR ACCELERATING CONVERGENCE OF RECURRENT NEURAL NETWORK FOR MACHINE FAILURE PREDICTION

FIELD OF INVENTION

The invention relates to machine failure prediction techniques, especially, a method and system for accelerating convergence of Recurrent Neural Network (RNN) for machine failure prediction using a proposed mechanism for updating learning rate and weight values in RNN.

BACKGROUND

Accurate prediction of machine failures is very important since it allows the user to avoid down time and service unavailability by taking preventive actions. Especially, for machines involved in providing basic services like telecommunication, transport etc., it is critical to prevent machine failures since any service-impacting fault, e.g. unavailability of service, may attract legal action and heavy financial penalty by regulatory authorities. Also, accurate machine failure prediction may greatly reduce efforts and costs required for maintenance of machines, e.g. the number and urgency of site visits for attending to machine failures. However, it is not easy to predict machine failures accurately as it is not possible to consider all of the factors which may result in machine failures and also it is not economically feasible to collect all of the data related to machine failure prediction.

Recurrent Neural Network (RNN) has been widely used to predict machine failures since RNN can model any sequence involving functional and temporal relationships. One challenge with RNN based sequence modelling for machine failure prediction is the speed of convergence, especially when a large number of machines need to be predicted in a short time period, e.g. 50,000 machines in a telecom infrastructure within 2 hours. In existing technology, standard Nesterov Accelerated Gradient (NAG) method as well as some variants of NAG method for Stochastic Gradient Decent (SGD), has been proposed for accelerating gradient descent in RNN. However, these methods need to change the standard gradient calculation and may involve complex computation. Also, these methods may create risk of non-convergence in order to accelerate the convergence of RNN.

It is therefore desirable to provide an effective and simple solution for accelerating convergence of RNN for machine failure prediction without creating risk of non-convergence of the network.

SUMMARY OF INVENTION

Embodiments of the invention propose a solution for accelerating convergence of RNN for machine failure prediction. In this solution, acceleration of convergence of RNN is achieved by updating learning rate and weight values used in RNN according to a proposed mechanism.

According to one aspect of the invention, a method for accelerating convergence of Recurrent Neural Network (RNN) for machine failure prediction, is provided. The method comprises:

setting, by a processor in a computer system, initial parameters in RNN wherein the initial parameters include an initial learning rate which is determined based on a standard deviation of a plurality of basic memory depth values identified from a machine failure sequence;

training RNN based on the initial parameters and at the end of each predetermined time period, calculating, by the processor, a current pattern error based on a vector distance between the machine failure sequence and current predicted sequence; and if the current pattern error is less than or not greater than a predetermined error threshold value, determining, by the processor, an updated learning rate based on the current pattern error, and updating weight values between input and hidden units in RNN based on the updated learning rate.

According to a second aspect of the invention, a system for accelerating convergence of RNN for machine failure prediction is provided. The system comprises a computer system having a processor and a memory communicably coupled to the processor, wherein the memory is configured to store instructions to be executed by the processor, wherein the processor is configured to set initial parameters in RNN wherein the initial parameters include an initial learning rate which is determined based on a standard deviation of a plurality of basic memory depth values identified from a machine failure sequence;

train RNN based on the initial parameters and at the end of each predetermined time period, calculate current pattern error based on a vector distance between the machine failure sequence and a current predicted sequence; and if the current pattern error is less than or not greater than a predetermined error threshold value, determine an updated learning rate based on the current pattern error, and update weight values between input and hidden units in RNN based on the updated learning rate.

According to a third aspect of the invention, a non-transitory computer readable medium is provided. The non-transitory computer readable medium comprises computer program code for accelerating convergence of Recurrent Neural Network (RNN) for machine failure prediction, wherein the computer program code, when executed, is configured to cause a processor in a computer system to perform the method for accelerating convergence of RNN for machine failure prediction proposed in embodiments of the invention.

With the method and system provided by embodiments of the invention, the convergence of RNN can be greatly accelerated without involving additional complex computation and without increasing any risk of non-convergence.

BRIEF DESCRIPTION OF THE DRAWINGS

The invention will be described in detail with reference to the accompanying drawings, in which.

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of one of the methods or systems are analogously valid for the other methods or systems. Similarly, embodiments described in the context of a method are analogously valid for a system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements.

As used herein, the terms "first," "second," and "third," etc. are used merely as labels, and are not intended to impose numerical requirements on their objects.

As used herein, the term "configured to" is interchangeable with "operative" or "adapted to".

Embodiments of the invention provide method and system for accelerating convergence of RNN for machine failure prediction problem. The convergence of RNN is accelerated by using a proposed mechanism for updating learning rate and weight values in RNN. The solution starts with an initial learning rate which is determined based on a standard deviation of a plurality of inter-failure gap values in a machine failure sequence. Then, RNN is trained based on the initial learning rate and at the end of each predetermined time period, e.g. an epoch, or more than one epoch, the learning rate used in RNN is updated based on a current pattern error if the current pattern error is not less than or greater than a predetermined error threshold value. Accordingly, the weight values in RNN are updated based on the updated learning rate. The current pattern error at the end of a predetermined time period is calculated based on a vector distance between the machine failure sequence and a current predicted sequence at the end of the predetermined time period.

Figure 1A:
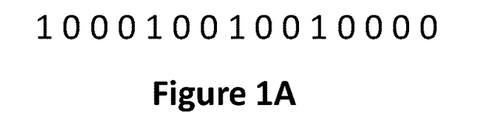
FIG. 1A shows an example of a sequence of machine failure history.

FIG. 1A shows an example of a sequence of machine failure history, i.e. a machine failure sequence. In embodiments of this invention, 0 in a machine failure sequence represents negative failure occurrence indicator, i.e. there is no machine failure; and 1 represents positive failure occurrence indicator, i.e. there is a machine failure. A basic memory depth value included in a machine failure sequence refers to an inter-failure gap value, i.e. the number of zeroes between two successive positive failure occurrence indicators. In this example, the machine failure sequence includes four basic memory depth values which are 3, 2, 2 and 4.

In embodiments of this invention, an elementary sequence refers to a machine failure sequence in which failures happen at a regular interval, i.e. all of the basic memory depth values included in an elementary sequence are same. Further, the sequence length of an elementary sequence is at least the minimum length required for prediction of machine failures. A composite sequence refers to a machine failure sequence in which failures happen in irregular intervals, i.e. composite sequence includes a plurality of different basic memory depth values.

Recurrent Neural Network (RNN) Used in Embodiments of the Invention

Figure 1B:
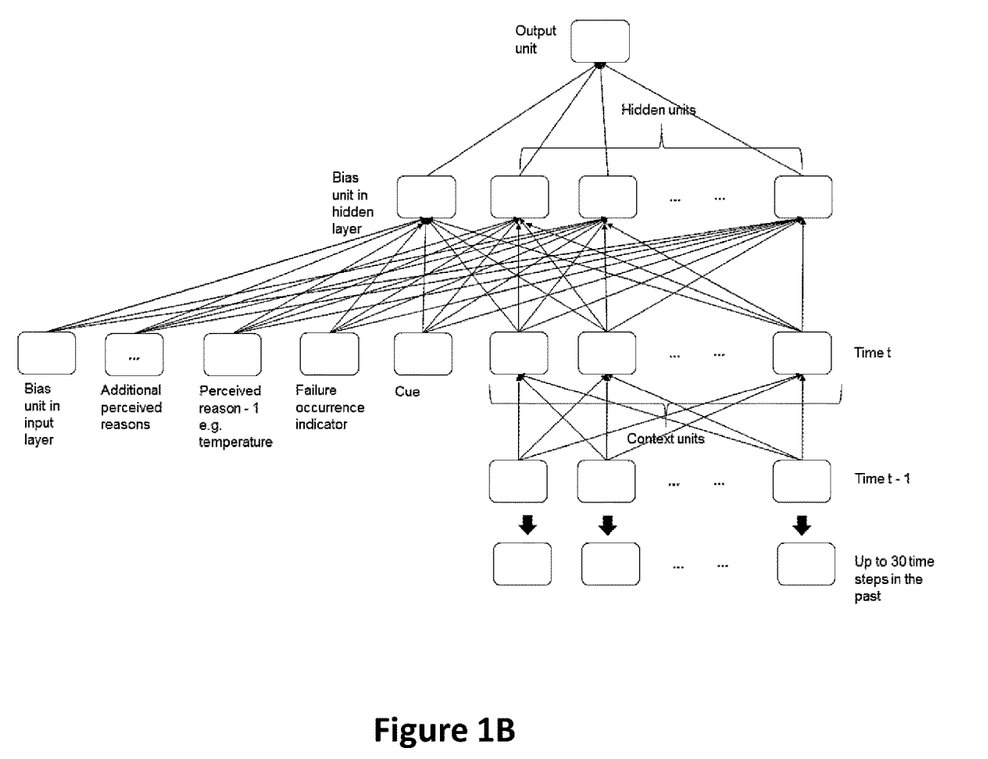
FIG. 1B shows a structure of RNN used for machine failure prediction according to some embodiments of the invention.

In embodiments of the invention, RNN is used for sequence modelling. FIG. 1B shows a structure of RNN for machine failure prediction used in some embodiments of the invention. In these embodiments, special initialization and cue unit in the input layer is used as an aid to remember long time gaps. Value of cue unit used in the input layer may be calculated as a count value of time steps from the immediately preceding machine failure in the machine failure sequence divided by 100.

Sequence modelling using RNN employs an iterative approach: each iteration consists of predicting the next value in the machine failure sequence based on the value in current position and values of the context units. Once the whole length of the sequence is predicted, one epoch is completed and the next epoch starts from the beginning of the machine failure sequence. In each iteration, weight values between context units and hidden units and weight values between hidden units and output units are updated based on gradient of objective function. For RNN, each iteration consists of going back through time to update the current weight values. There are two major challenges in using RNN for sequence modelling:

1. Determining Initial Weight Values to be Used in RNN

The initial weight values should be close to the final values. If this condition is not satisfied, network may take long time to converge or may not converge at all. The reason is that an underlying gradient descent method expects the unknown parameters to have values close to their final values.

In embodiments of this invention, to satisfy this condition, initial weight values between input and hidden units in RNN are calculated as average values of weight values for a plurality of elementary sequences wherein each elementary sequence has a basic memory depth value included in the machine failure sequence.

2. Determining Learning Rate and Gradient Acceleration to be Used in RNN

Even if the first challenge is overcome, RNN may still take long time to converge due to the changes in learning rate and weight values in each iteration. In embodiments of this invention, a mechanism for updating learning rate and weight values is proposed to control RNN for this challenge.

Weight Value Update Mechanism

Gradient descent is a common method used for minimization of complex functions of many variables. The basic idea is to start with some initial values of all unknown parameters and then calculate gradients, i.e. partial derivatives, of the objective function and change each parameter by adding a small fraction of negative of gradient. This process continues for many iterations until objective function does not change further. For neural networks, unknown parameters are connection weights. The standard update of weight values follows Equation (1) as mentioned below:

$$W_{updated} = W_{current} - \eta * \nabla \quad (1)$$

where, Wupdated refers to the updated weight value, Wcurrent refers to the current weight value before update, η refers to the current learning rate and ∇ refers to the gradient.

In embodiments of the invention, the weight value may be updated according to the following Equation $$W_{updated} = W_{current} - \eta_{updated} * \nabla \quad (2)$$

Equation (2) is similar to the standard gradient update as indicated in Equation (1). The only difference is that an updated learning rate $\eta_{updated}$ is used to calculate the updated weight value.

Mechanism for Updating Learning Rate

Embodiments of the invention propose a mechanism for updating learning rate. The mechanism for updating learning rate is used to define how much to travel in each direction (weights) at each iteration based on the gradient of objective function. Objective function is squared sum of error for each item in sequence. The purpose of the mechanism is to guide the traversal of parameter values, e.g. weight values, so that the minimum of objective function is to be reached with the minimum number of epochs.

The mechanism for updating learning rate defines a method for determining an initial learning rate. The initial learning rate has an important role in convergence performance of RNN. It is to be appreciated by a person skilled in the art that learning rate should be lesser with increase of non-uniformity or irregularity in a machine failure sequence. In embodiments of this invention, non-uniformity of a machine failure sequence is measured by a standard deviation (σ) of inter-failure gap values in the machine failure sequence.

The mechanism for updating learning rate also includes a learning rate schedule which defines how learning rate changes as the iteration progresses in RNN based on a performance measure. Specifically, the learning rate schedule defines how to determine a base updated learning rate based on the current pattern error at the end of each predetermined time period, e.g. one epoch. The current pattern error at the end of a predetermined time period is calculated based on a vector distance between the machine failure sequence and the predicted sequence at the end of the predetermined time period.

In some embodiments of the invention, to further update the learning rate at the end of each predetermined time period based on performance of RNN, the mechanism for updating learning rate may further include a gradient acceleration schedule which defines a reward or penalty to the learning rate based on whether current pattern error has decreased or increased as compared to an immediately preceding pattern error, i.e. pattern error in the immediately preceding time period.

In some embodiments of the invention, the mechanism for updating learning rate may further include a bonus acceleration schedule which defines a bonus increase in learning rate when weight value updates have consistently performed well, i.e. vector distance has reduced for a predetermined count value of consecutive time periods. In one example, the bonus acceleration schedule provides additional acceleration percentage to the base updated learning rate when RNN is near convergence and pattern error has continually decreased during a predetermined count value of time periods.

Figure 1C:
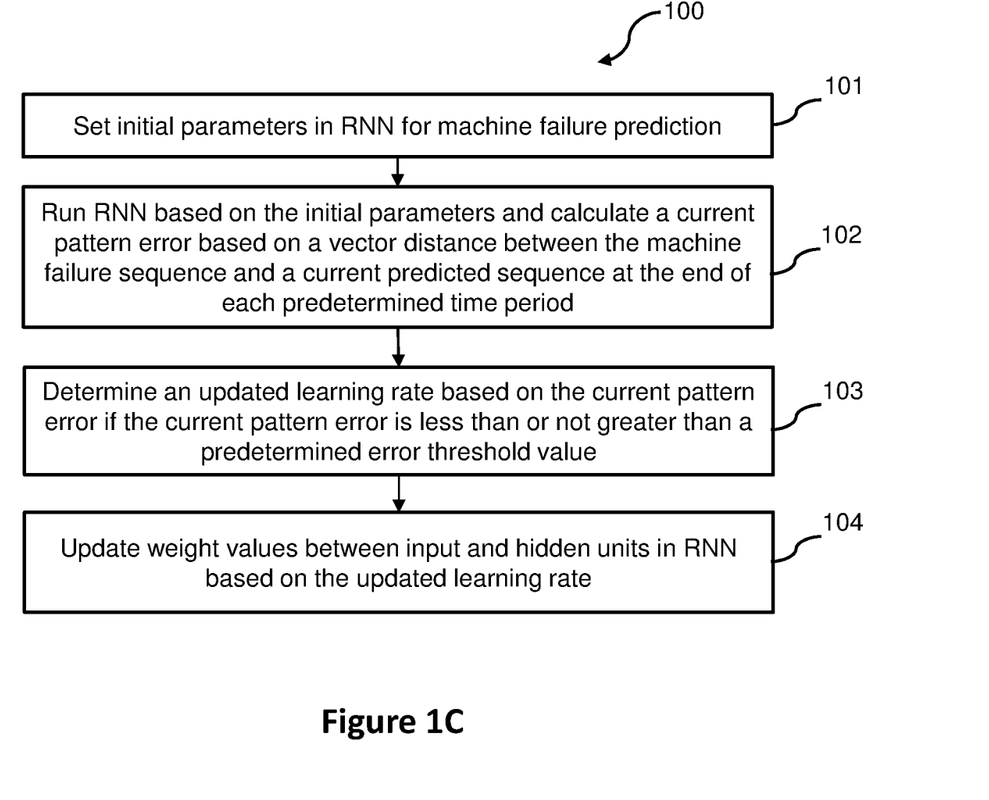
FIG. 1C is a flowchart illustrating a method for accelerating convergence of RNN for machine failure prediction according to one embodiment of the invention.

FIG. 1C is a flowchart illustrating a method 100 for accelerating convergence of RNN for machine failure prediction according to one embodiment of the invention.

In block 101, a processor in a computer system sets initial parameters in RNN for machine failure prediction.

The initial parameters include initial learning rate in RNN. In one embodiment of this invention, the initial learning rate is determined based on a standard deviation (σ) of inter-failure gap values in the machine failure sequence. Through extensive experimentation on many machine failure sequences, Equation (3) below is proposed to calculate initial learning rate in one example. However, this is not intended to limit the scope of the invention. The initial learning rate may be calculated by other methods in some embodiments of the invention.

$$\eta_0 = 2.24 - 0.08\sigma \quad (3)$$

wherein $\eta_0$ refers to the initial learning rate, and σ refers to the standard deviation of the basic memory depth values in the machine failure sequence.

In block 102, the processor trains RNN based on the initial parameters and calculates a current pattern error based on a vector distance between the machine failure sequence and a current predicted sequence at the end of each predetermined time period.

It should be noted that the predetermined time period may be one epoch, or more than one epoch. Preferably, the predetermined time period is one epoch.

In block 103, the processor determines an updated learning rate based on the current pattern error if the current pattern error is less than or not greater than a predetermined error threshold value.

In some embodiments of the invention, the step of updating learning rate based on the current pattern error may include:

updating the learning rate based on the proposed learning rate schedule; or a combination of the learning rate schedule and the gradient acceleration schedule; or a combination of the learning rate schedule, the gradient acceleration schedule and the bonus acceleration schedule.

In block 104, the processor updates weight values between input and hidden units in RNN based on the updated learning rate.

The processor may update the weight values according to Equation (2) above.

Figure 2:
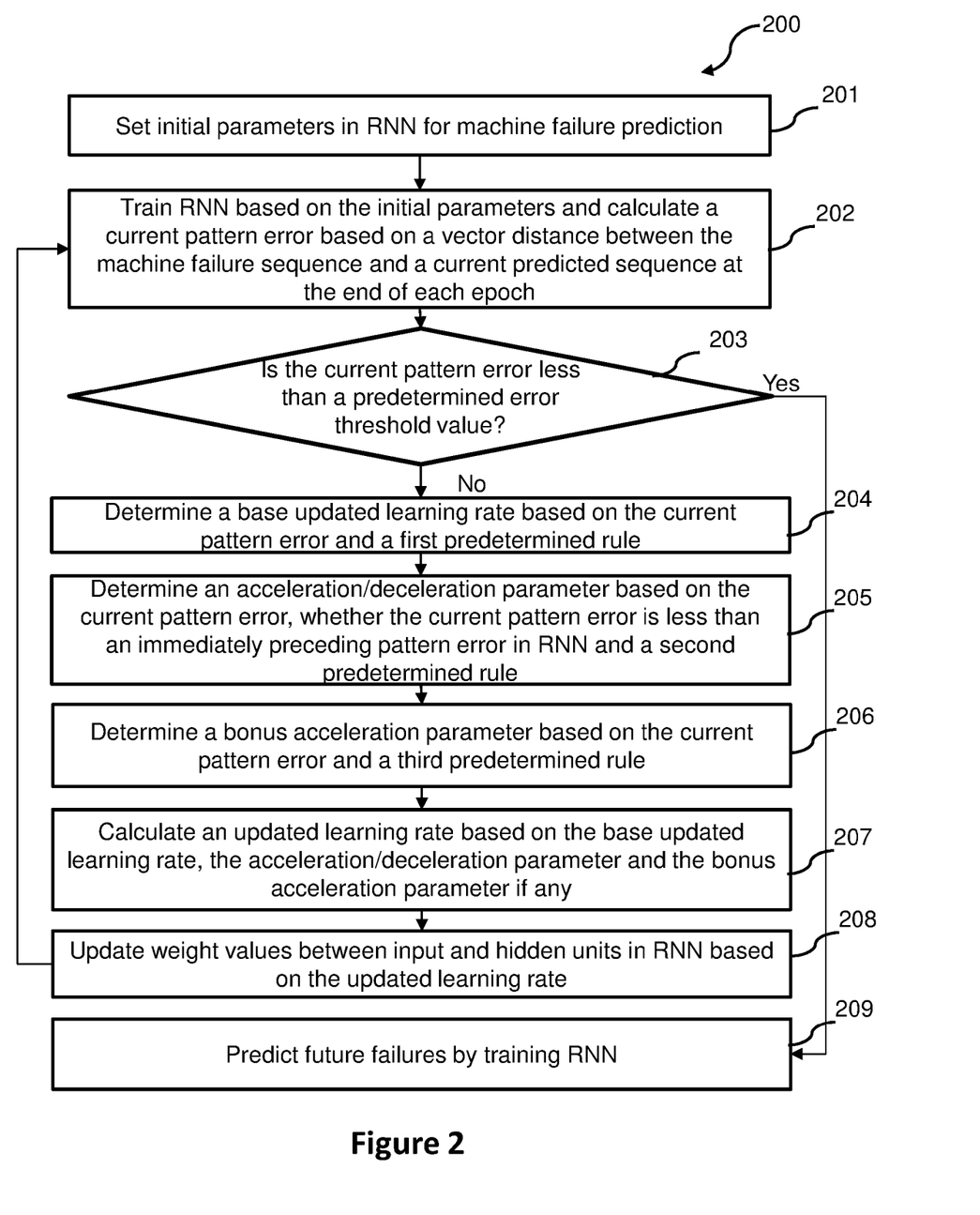
FIG. 2 is a flowchart illustrating a method for accelerating convergence of RNN for machine failure prediction according to one embodiment of the invention.

FIG. 2 is a flowchart illustrating a method 200 for accelerating convergence of RNN for machine failure prediction according to one embodiment of the invention. In this embodiment, the predetermined time period is an epoch.

In block 201, a processor in a computer system sets initial parameters in RNN for machine failure prediction.

The initial parameters include initial learning rate, initial weight values between input and hidden units, and initial learning rate in RNN. The initial parameters may also include initial pattern error and initial acceleration. In one example, the initial pattern error is set as 99 and the initial acceleration is set as 0%.

In this embodiment, the initial learning rate is determined based on Equation (3). The initial weight values may be determined as average values of weight values for a plurality of elementary sequences wherein each of the plurality of elementary sequences has a basic memory depth value included in the machine failure sequence.

In one example, before setting initial parameters, RNN may be configured with the following details:
Input units: 2 (Bias and failure indicator (0 or 1)
Context units: 50
Hidden units: 51 (Bias+50 units)
Output unit: 1
Number of previous time gaps for back propagation: 30
Activation: Sigmoid for both hidden and output In block 202, the processor trains RNN based on the initial parameters and calculates a current pattern error based on a vector distance between the machine failure sequence and a current predicted sequence at the end of each epoch.

In one example, the current pattern error is calculated according to the following Equation (4):

$$\text{Pattern error}=1-\text{Vector distance}=1-A \cdot A/|A||P| \quad (4)$$

wherein A refers to the machine failure sequence input in RNN and P refers to the predicted sequence at the end of each epoch.

In block 203, the processor compares the current pattern error with a predetermined error threshold value to determine whether the current pattern error is less than a predetermined error threshold value, if yes, the process proceeds to block 209; if not, the process proceeds to block 204.

In one example, the predetermined error threshold value is determined according to the following Equation (5):

$$Es=0.03-\sigma/1800 \quad (5)$$

wherein Es refers to the predetermined error threshold value, and σ refers to the standard deviation of the basic memory depth values in the machine failure sequence.

In another example, the predetermined error threshold value may be determined according to the following Equation (6):

$$Es=Ee-\sigma/1800 \quad (6)$$

wherein Ee refers to an error threshold value obtained by experimentation based on an elementary sequence which has a depth value equal to an average value of the basic memory depth values in the machine failure sequence.

It should be noted that in this embodiment, the condition for updating learning rate is whether the current pattern error is less than the predetermined error threshold value, however, in other embodiments, the condition for updating learning rate may be whether the current pattern error is not greater than the predetermined error threshold value.

Block 204 to block 207 describe the process of determining an updated learning rate based on the current pattern error according to this embodiment of the invention.

In block 204, the processor determines a base updated learning rate based on the current pattern error and a first predetermined rule. The first predetermined rule defines a relationship between current learning rate and the base updated learning rate depending on the current pattern error.

In one example, the first predetermined rule includes if the current pattern error is less than 0.60 and not less than 0.55, the base learning rate is 1/14 of the current learning rate used in RNN; and if the current pattern error is less than 0.55, the base learning rate is 1/2 of the current learning rate used in RNN.

In one example, the first predetermined rule may be stored in a pre-stored table as shown in Table 1 below. Accordingly, the processor retrieves a base updated learning rate from the pre-stored table based on the current pattern error. The pre-stored table is stored in a memory and includes a plurality of mappings wherein each mapping associates a pattern error range to a relationship between the current learning rate and the base updated learning rate. As shown in Table 1, the base updated learning rate is reduced with a decrease in the pattern error. The first predetermined rule, i.e. learning rate schedule, in Table 1 is proposed for machine failure problems with inter-failure gaps of up to 50 time steps.

Table 1 shows an example of the pre-stored table for the first predetermined rule. The base updated learning rates in the table are determined by experimentation. In table 1, $\eta_{base}$ refers to the base updated learning rate, and $\eta_{current}$ refers to the current learning rate.

TABLE 1

| Pattern error range | Base updated learning rate $\eta_{base}$ |
| --- | --- |
| <0.60 | $\eta_{base} = \eta_{current}/14$ |
| <0.55 | $\eta_{base} = \eta_{current}/2$ |
| <0.50 | $\eta_{base} = \eta_{current}/2$ |
| <0.40 | $\eta_{base} = \eta_{current}/2$ |
| <0.30 | $\eta_{base} = \eta_{current}/2$ |
| <0.25 | $\eta_{base} = \eta_{current}/2$ |
| <0.20 | $\eta_{base} = \eta_{current}/2$ |
| <0.10 | $\eta_{base} = \eta_{current}/2$ |

It should be noted that preferably, the learning rate schedule corresponding to each specific pattern error range in Table 1 is not to be applied twice. For example, if the Initial pattern error is 0.8, after first epoch, the pattern error becomes 0.35, then the learning rate schedule corresponding to the pattern error range of less than 0.40 is to be applied, and the learning rate is to be updated as $\eta_{base}=\eta_{current}/2$. If in next epoch, the pattern error becomes 0.57, then accordingly the learning rate schedule corresponding to the pattern error range of less than 0.60 is to be applied, and the learning rate is to be updated as $\eta_{base}=\eta_{current}/14$. Then after few epochs, if the pattern error becomes 0.38, then the learning rate schedule corresponding to the pattern error range of less than 0.40 should be applied, but since this schedule has been applied once, this time, the learning rate is not to be updated.

In block 205, the processor determines an acceleration/deceleration parameter based on the current pattern error, whether the current pattern error is less than an immediately preceding pattern error in RNN, i.e. the pattern error at the end of the immediately preceding epoch, and a second predetermined rule. The second predetermined rule associates an acceleration parameter and a deceleration parameter to a predetermined pattern error range.

In one example, the second predetermined rule may include: if the current pattern error is greater than or equal to 0.3, the acceleration parameter is 70%, the deceleration parameter is 30%;
   if the current pattern error is less than 0.3 and greater than or equal to 0.2, the acceleration parameter is 40%, the deceleration parameter is 20%;
   if the current pattern error is less than 0.2 and greater than or equal to 0.1, the acceleration parameter is 30%, the deceleration parameter is 10%; and
   if the current pattern error is less than 0.1, the acceleration parameter is 10%, the deceleration parameter is 0%.

In one example, the second predetermined rule may be stored in a pre-stored table as shown in Table 2 below. Accordingly, the processor retrieves an acceleration parameter from the pre-stored table based on the current pattern error if the current pattern error is less than the immediately preceding pattern error in RNN, i.e. the pattern error at the end of the immediately preceding epoch; or retrieves a deceleration parameter from the pre-stored table based on the current pattern error if the current pattern error is not less than or greater than the immediately preceding pattern error in RNN.

Table 2 shows an example of the pre-stored table for the second predetermined rule. The acceleration/deceleration parameters in the table are determined by experimentation.

TABLE 2

| Pattern error range | Acceleration parameter (%) | Deceleration parameter (%) |
|---|---|---|
| ≥0.3 | 70% | −30% |
| <0.3 and ≥0.2 | 40% | −20% |
| <0.2 and ≤0.1 | 30% | −10% |
| <0.1 | 10% | −0% |

From the second predetermined rule in Table 2, it can be seen that the acceleration parameter is always higher than deceleration parameter i.e. reward for learning rate is higher than penalty. Therefore, the mechanism for updating learning rate is optimized in the sense that the learning rate is not decreased as much as it is increased with changes of pattern errors. In addition, as the process moves towards convergence of RNN, both acceleration parameter and deceleration parameter are decreased so as not to distract away from current search direction. Please also note that in some embodiments of the invention, the acceleration/deceleration parameter is applied as a percentage increase or decrease on the base updated learning rate at the end of each epoch. If the pattern error decreases and the learning rate is updated based on a less acceleration parameter or deceleration parameter, then even if pattern error increases later, acceleration and deceleration of the learning rate always remain the minimum value encountered. This mechanism assumes that when the learning rate already nears the final value, even if the pattern error becomes higher, the acceleration or deceleration of learning rate is not be increased since, in that case, the convergence of RNN may be negatively affected.

In block 206, the processor determines a bonus acceleration parameter based on the current pattern error and a third predetermined rule, wherein the third predetermined rule defines that if pattern errors have continually decreased in a predetermined count value of the predetermined time periods, a predetermined bonus acceleration parameter is to be used to determine the updated learning rate.

In one example, the third predetermined rule includes: if the pattern errors have continually decreased in preceding 10 epochs and the current pattern error is not greater than 0.3, the base updated learning rate is further increased based on a predetermined bonus acceleration parameter. The predetermined bonus acceleration parameter is 20% which is determined by experimentation.

In one example, the bonus acceleration schedule may be implemented by using a Convergence Acceleration Counter (CAC). CAC is initialized to zero. It is reinitialized to zero whenever the current pattern error is greater than the immediately preceding pattern error. Otherwise, it is incremented. When CAC reaches a predetermined threshold value, bonus acceleration is applied to the learning rate.

In block 207, the processor calculates an updated learning rate based on the base updated learning rate, the acceleration/deceleration parameter and the bonus acceleration parameter if any.

In one example, the updated learning rate may be calculated according to the following Equation (7):

$$\eta_{updated} = \eta_{base} * (1 + \alpha + \beta) \quad (7)$$

wherein $\eta_{updated}$ refers to the updated learning rate, $\eta_{base}$ refers to the base updated learning rate, $\alpha$ refers to the acceleration/deceleration parameter and $\beta$ refers to the bonus acceleration parameter In block 208, the processor updates weight values between input and hidden units in RNN in each iteration based on the updated learning rate.

In one example, the processor may update weight values in each iteration according to Equation (2).

In block 209, the processor predicts future machine failure by training RNN.

Figure 3:
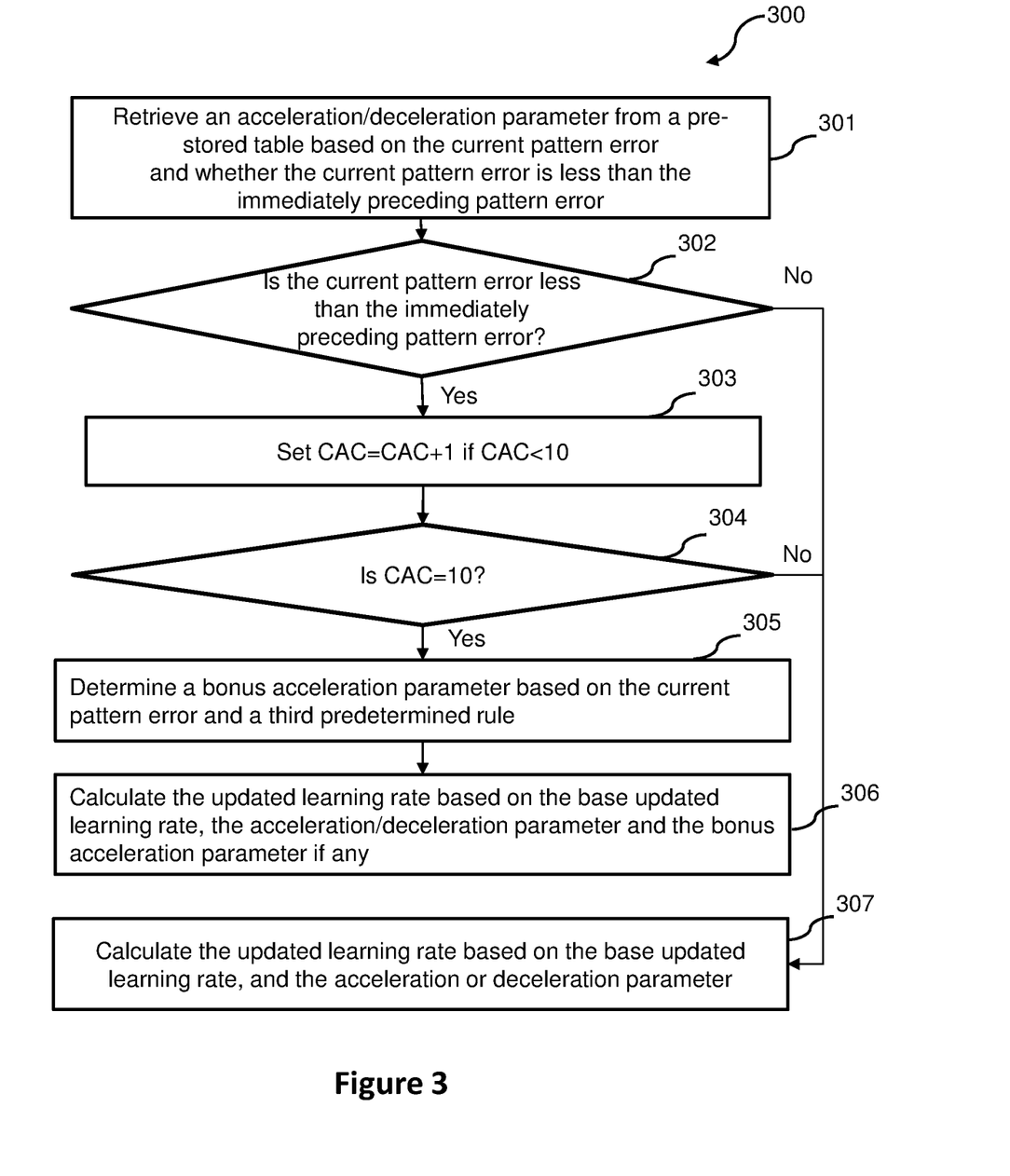
FIG. 3 is a flowchart showing a process to calculate the updated learning rate according to one embodiment of the invention.

FIG. 3 is a flowchart illustrating a process to calculate the updated learning rate according to one embodiment of the invention.

In block 301, the processor retrieves an acceleration/deceleration parameter from a pre-stored table based on the current pattern error and whether the current pattern error is less than the immediately preceding pattern error.

The pre-stored table, as shown in Table 2, includes a plurality of mappings and each mapping associates a predetermined pattern error range to both an acceleration parameter and a deceleration parameter.

In block 302, the processor determines whether the current pattern error is less than the immediately preceding pattern error, if yes, the process proceeds to block 303, otherwise, the process proceeds to block 307.

In block 303, the processor sets a count value CAC=CAC+1 if CAC<10.

In this embodiment, the predetermined maximum count value is set as 10. However, a person skilled in the art would understand that this is not intended to limit the scope of the invention. In other embodiments, the maximum count value may be set as a different integer, e.g. 5.

In block 304, the processor determines whether the count value of CAC is equal to 10. If yes, the process proceeds to block 305, otherwise, the process proceeds to block 307.

In block 305, the processor determines a bonus acceleration parameter based on the current pattern error and a third predetermined rule.

In this embodiment, the third predetermined rule is that if the count value of CAC is equal to 10 and the current pattern error is not greater than 0.3, a bonus acceleration parameter 20% is added to determine the updated learning rate.

Table 3 shows an example of the bonus acceleration schedule or the third predetermined rule.

TABLE 3

| CAC threshold value | Pattern error restriction | Bonus acceleration parameter |
|---|---|---|
| 10 | <=0.3 | 20% |

In block 306, the processor calculates the updated learning rate based on the base updated learning rate, the acceleration/deceleration parameter and the bonus acceleration parameter if any.

In block 307, the processor calculates the updated learning rate based on the base updated learning rate, and the acceleration or deceleration parameter.

Embodiments of the invention also propose a system for accelerating convergence of RNN for machine failure prediction. The system includes a computer system having a processor and a memory, wherein the memory is communicably coupled to the processor and configured to store instructions to be executed by the processor, wherein the processor is configured to carry out the method proposed by the embodiments of the invention.

Experimental Results

Table 4 below shows the results of applying the method proposed by some embodiments of the invention on 53 machine failure sequences to solve the machine failure prediction problems. All of the 53 machine failure sequences are composite sequences.

In the experiment, RNN as shown in FIG. 1A is used to predict future machine failures and RNN is configured with 50 context units and a single output unit. Bias units were used in both input and hidden layers. Input layer has a cue unit in addition to failure occurrence indicator. Sigmoid activation functions were used in both hidden and output layers. Gradient contributions were considered from 30 previous time steps.

These machine failure sequences/problems were chosen in such a way that they not only test whether the method proposed by embodiments of the invention is suitable for modelling sequences with long temporal dependency, but also whether it is suitable for modelling sequences with non-uniform pattern, i.e. failures do not happen in exact pattern.

In the experiment, the predetermined error threshold value is calculated according to Equation (5) mentioned above. The initial learning rates were experimentally determined to have minimum epochs for the method proposed by embodiments of the invention. However, these can be derived, with small approximation difference, using Equation (3) provided in embodiments of the invention above.

TABLE 4

| Sl. No. | Composite Sequence | Std. dev. of inter-failure gaps | Vector Distance Error Threshold | Initial Learning Rate | Epochs - Current Invention | Epochs - Simplified NAG |
|---|---|---|---|---|---|---|
| 1 | 10-15-20-10-15 | 4.082 | 0.03 | 2.000 | 84 | 205 |
| 2 | 10-20-25-10-20 | 6.292 | 0.03 | 1.825 | 175 | 170 |
| 3 | 15-25-40-15-25 | 10.308 | 0.04 | 1.500 | 137 | 86 |
| 4 | 20-35-50-20-35 | 12.247 | 0.04 | 1.210 | 255 | 273 |
| 5 | 10-25-40-50-10-25-40 | 14.376 | 0.04 | 1.094 | 205 | 608 |
| 6 | 10-15-45-50-10-15-45 | 18.439 | 0.04 | 0.715 | 180 | 75 |
| 7 | 20-35-45-50-20-35-45 | 10.801 | 0.04 | 1.331 | 265 | 400 |
| 8 | 10-20-35-45-10-20-35 | 12.942 | 0.04 | 1.249 | 243 | 230 |
| 9 | 15-30-40-45-15-30-40 | 10.801 | 0.04 | 1.330 | 461 | 1144 |
| 10 | 10-20-35-45-50-10-20-35-45 | 14.392 | 0.04 | 1.095 | 447 | 408 |
| 11 | 10-15-25-40-50-10-15-25-40 | 14.392 | 0.04 | 1.114 | 263 | 201 |
| 12 | 15-25-35-45-50-15-25-35-45 | 12.082 | 0.04 | 1.207 | 391 | 1083 |
| 13 | 15-30-40-45-50-15-30-40-45 | 11.319 | 0.04 | 1.207 | 760 | 852 |
| 14 | 15-10-25-35-45-15-10-25-35 | 12.817 | 0.04 | 1.211 | 242 | 202 |
| 15 | 10-20-30-35-45-50-10-20-30-35-45 | 12.737 | 0.04 | 1.160 | 532 | 430 |
| 16 | 10-15-25-30-40-45-10-15-25-30-40 | 11.844 | 0.04 | 1.216 | 455 | 265 |
| 17 | 10-17-30-43-10-17-30 | 12.046 | 0.04 | 1.230 | 149 | 178 |
| 18 | 10-25-38-49-10-25-38 | 13.674 | 0.04 | 1.114 | 294 | 392 |
| 19 | 15-28-42-50-15-28-42 | 12.781 | 0.04 | 1.177 | 324 | 252 |
| 20 | 11-20-33-45-11-20-33 | 12.247 | 0.04 | 1.208 | 157 | 511 |
| 21 | 15-25-37-47-15-25-37 | 11.454 | 0.04 | 1.310 | 222 | 468 |
| 22 | 11-25-33-50-11-25-33 | 12.865 | 0.04 | 1.186 | 282 | 355 |
| 23 | 33-18-10-40-33-18-10 | 12.357 | 0.04 | 1.308 | 177 | 210 |
| 24 | 33-15-40-50-33-15-40 | 14.359 | 0.04 | 1.199 | 799 | 882 |
| 25 | 10-17-32-43-10-15-32 | 12.734 | 0.04 | 1.207 | 280 | 173 |
| 26 | 11-20-31-44-11-21-33 | 11.673 | 0.04 | 1.239 | 387 | 255 |
| 27 | 21-35-47-50-21-35-45 | 10.741 | 0.04 | 1.332 | 1264 | 2012 |
| 28 | 41-10-27-35-41-10-27 | 12.759 | 0.04 | 1.206 | 328 | 238 |
| 29 | 45-13-26-10-35-20-50 | 14.949 | 0.04 | 1.069 | 800 | 821 |
| 30 | 45-13-26-10-45-13-50 | 17.498 | 0.04 | 0.810 | 665 | 802 |
| 31 | 45-13-26-10-45-20-50 | 16.657 | 0.04 | 0.910 | 815 | 743 |
| 32 | 33-15-24-50-33-15-24 | 13.197 | 0.04 | 1.233 | 290 | 223 |
| 33 | 20-37-15-40-20-37-15 | 11.877 | 0.04 | 1.375 | 506 | 581 |
| 34 | 25-10-33-45-25-12-30 | 13.258 | 0.04 | 1.243 | 545 | 542 |
| 35 | 25-44-12-30-20-44-12 | 14.738 | 0.04 | 1.190 | 333 | 541 |
| 36 | 22-40-10-35-20-42-12 | 14.279 | 0.04 | 1.195 | 1082 | 705 |
| 37 | 17-30-50-10-17-40-50 | 16.857 | 0.04 | 0.966 | 656 | 840 |
| 38 | 17-30-50-10-17-30-50 | 16.497 | 0.04 | 1.029 | 511 | 138 |
| 39 | 11-27-40-33-10-25-40 | 11.303 | 0.04 | 1.235 | 1065 | 1351 |
| 40 | 15-25-40-50-15-20-34 | 13.140 | 0.04 | 1.192 | 648 | 695 |
| 41 | 30-11-25-40-11-25-30 | 11.237 | 0.04 | 1.395 | 445 | 1027 |
| 42 | 14-29-50-45-14-25-50 | 15.003 | 0.04 | 1.050 | 782 | 522 |
| 43 | 11-25-40-28-11-25-38 | 10.496 | 0.04 | 1.450 | 437 | 1376 |
| 44 | 15-30-23-40-15-23-45 | 11.361 | 0.04 | 1.366 | 329 | 524 |
| 45 | 15-32-25-45-15-30-20 | 10.496 | 0.04 | 1.380 | 463 | 244 |
| 46 | 50-30-10-28-50-28-10 | 14.913 | 0.04 | 0.980 | 894 | 973 |
| 47 | 20-35-10-40-20-35-10 | 13.416 | 0.04 | 1.230 | 155 | 127 |
| 48 | 50-35-20-10-50-35-20 | 14.376 | 0.04 | 1.062 | 236 | 274 |
| 49 | 14-29-41-50-14-25-40 | 12.983 | 0.04 | 1.115 | 925 | 1163 |
| 50 | 50-35-20-10-50-35-22 | 14.166 | 0.04 | 1.078 | 1026 | 445 |
| 51 | 14-29-41-50-41-29-14 | 12.681 | 0.04 | 1.135 | 703 | 871 |
| 52 | 20-35-10-40-20-35-13 | 12.787 | 0.04 | 1.335 | 819 | 962 |
| 53 | 21-34-45-50-20-35-45 | 10.870 | 0.04 | 1.336 | 661 | 1870 |
| | | | | Total | 25549 | 30918 |

From the table above, it can be seen that the method proposed by embodiments of the invention takes 17% lesser number of epochs compared to the existing Simplified NAG method.

Figure 4:
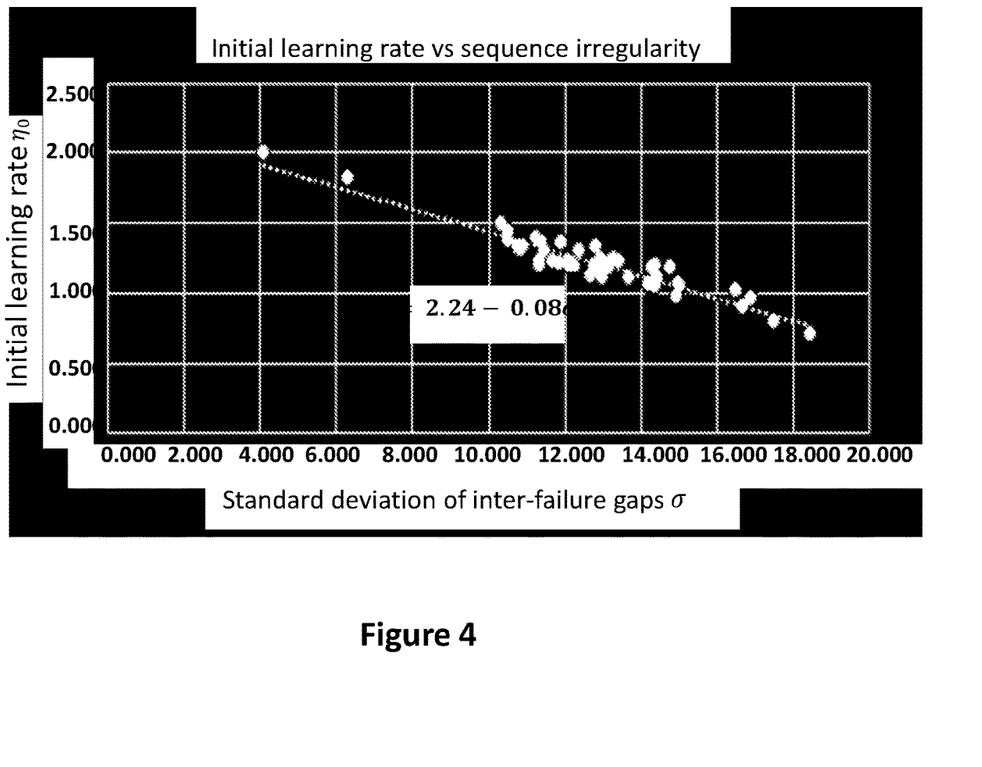
FIG. 4 shows a chart illustrating that the initial learning rate decreases as irregularities in the composite sequence increases.

FIG. 4 shows a chart illustrating a relationship between initial learning rates and standard deviation of inter-failure gap values of the 53 machine failure sequences. As shown in FIG. 4, the initial learning rate decreases with increase of the standard deviation of inter-failure gap values in machine failure sequences. The results indicate that the initial learning rate of machine failure sequence decreases with increase of irregularity of the sequence.

Embodiments of the invention provide a first-order method which consistently performs better than the existing NAG method without incurring additional complex computation. Typically, any increase in speed of convergence of gradient descent also creates risk of non-convergence. However, the solution proposed by embodiments of the invention has always converged when it is tested against a large set of machine failure prediction problems.

In view of the above, the method and system for accelerating convergence of RNN for machine failure prediction proposed by embodiments of the invention have the following advantages:

1. In contrast with the existing NAG method, the method and system proposed by embodiments of the invention do not require any change to the standard gradient calculation and no additional complicated calculation is involved. The only required change is that in embodiments of the invention, a current pattern error is required to calculate based on the vector distance between the actual machine failure sequence and the predicted sequence at the end of each predetermined time period, e.g. each epoch.
2. The method and system proposed by embodiments of the invention do not create any risk of non-convergence. This conclusion is based on extensive testing done for machine failure prediction problems with inter-failure gaps up to 50 time steps.
3. The method and system proposed by embodiments of the invention may be faster than the existing NAG method. As shown in the experimental results, 17% lesser epochs are required by the method proposed by some embodiments of the invention compared to the existing NAG method.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for accelerating convergence of Recurrent Neural Network (RNN) for machine failure prediction, the method comprising:
    setting, by a processor in a computer system, initial parameters in RNN wherein the initial parameters include an initial learning rate which is determined based on a standard deviation of a plurality of basic memory depth values identified from a machine failure sequence;
    training RNN based on the initial parameters and at end of each predetermined time period,
    calculating, by the processor, a current pattern error based on a vector distance between the machine failure sequence and current predicted sequence; and
    if the current pattern error is less than or not greater than a predetermined error threshold value, determining, by the processor, an updated learning rate based on the current pattern error, and updating weight values between input and hidden units in RNN based on the updated learning rate.

2. The method according to claim 1, wherein the step of determining the updated learning rate based on the current pattern error comprises:
    determining, by the processor, a base updated learning rate based on the current pattern error and a first predetermined rule, wherein the first predetermined rule defines a relationship between current learning rate and the base updated learning rate based on the current pattern error.

3. The method according to claim 2, wherein the first predetermined rule comprises:
    if the current pattern error is less than 0.60 and not less than 0.55, the base updated learning rate is $\frac{1}{14}$ of the current learning rate; and
    if the current pattern error is less than 0.55, the base updated learning rate is $\frac{1}{2}$ of the current learning rate.

4. The method according to claim 2, wherein the step of determining the updated learning rate based on the current pattern error further comprises:
    determining, by the processor, an acceleration/deceleration parameter based on whether the current pattern error is less than an immediately preceding pattern error in RNN and a second predetermined rule, wherein the second predetermined rule associates an acceleration parameter and a deceleration parameter to a predetermined pattern error range; and
    calculating, by the processor, the updated learning rate based on the base updated learning rate and the acceleration/deceleration parameter.

5. The method according to claim 4, wherein the second predetermined rule comprises:
    if the current pattern error is greater than or equal to 0.3, the acceleration parameter is 70%, the deceleration parameter is 30%;
    if the current pattern error is less than 0.3 and greater than or equal to 0.2, the acceleration parameter is 40%, the deceleration parameter is 20%;
    if the current pattern error is less than 0.2 and greater than or equal to 0.1, the acceleration parameter is 30%, the deceleration parameter is 10%; and
    if the current pattern error is less than 0.1, the acceleration parameter is 10%, the deceleration parameter is 0%.

6. The method according to claim 4, wherein the step of determining the updated learning rate based on the current pattern error further comprises:
    determining, by the processor, a bonus acceleration parameter based on the current pattern error and a third predetermined rule, wherein the third predetermined rule comprises if pattern errors have continually decreased during a predetermined count value of the predetermined time periods, a predetermined bonus acceleration parameter is to be used for calculating the updated learning rate; and
    calculating, by the processor, the updated learning rate based on the base updated learning rate, the acceleration parameter and the bonus acceleration parameter if needed.

7. The method according to claim 6, wherein the predetermined count value is 10, the predetermined bonus acceleration parameter is 20% and the third predetermined rule further comprises: only if the current pattern error is not greater than 0.3, the bonus acceleration parameter is used to calculate the updated learning rate.

8. The method according to claim 1, further comprising:
calculating, by the processor, the initial learning rate according to the following equation:

$$\eta_0=2.24-0.08\sigma$$

wherein $\eta_0$ refers to the initial learning rate, and a refers to the standard deviation of the basic memory depth values in the machine failure sequence.

9. The method according to claim 1, further comprising:
calculating, by the processor, the predetermined error threshold value according to the following equation:

$$Es=0.03-\sigma/1800$$

wherein Es refers to the error threshold value, and a refers to the standard deviation of the basic memory depth values in the machine failure sequence.

10. The method according to claim 1, wherein the step of setting initial parameters in RNN further comprises:
setting, by the processor, initial weights between input and hidden units in RNN as an average of weights for a plurality of elementary sequences wherein each of the plurality of elementary sequences has a basic memory depth value included in the machine failure sequence.

11. A non-transitory computer readable medium comprising computer program code for accelerating convergence of Recurrent Neural Network (RNN) for machine failure prediction, wherein the computer program code, when executed, is configured to cause a processor in a computer system to perform a method according to claim 1.

12. A system for accelerating convergence of RNN for machine failure prediction, the system comprising: a computer system having a processor and a memory communicably coupled to the processor, wherein the memory is configured to store instructions to be executed by the processor, wherein the processor is configured to
set initial parameters in RNN wherein the initial parameters include an initial learning rate which is determined based on a standard deviation of a plurality of basic memory depth values identified from a machine failure sequence;
train RNN based on the initial parameters and at end of each predetermined time period;
calculate current pattern error based on a vector distance between the machine failure sequence and current predicted sequence; and
if the current pattern error is less than or not greater than a predetermined error threshold value, determine an updated learning rate based on the current pattern error, and update weight values between input and hidden units in RNN based on the updated learning rate.

13. The system according to claim 12, wherein the processor is further configured to determine a base updated learning rate based on a first predetermined rule, wherein the first predetermined rule defines a relationship between current learning rate and the base updated learning rate depending on the current pattern error.

14. The system according to claim 13, wherein the processor is further configured to determine an acceleration/deceleration parameter based on whether the current pattern error is less than an immediately preceding pattern error in RNN and a second predetermined rule, wherein the second predetermined rule associates an acceleration parameter and a deceleration parameter to a predetermined pattern error range; and
calculate the updated learning rate based on the base updated learning rate and the acceleration/deceleration parameter.

15. The system according to claim 14, wherein the processor is further configured to determine a bonus acceleration parameter based on the current pattern error and a third predetermined rule, wherein the third predetermined rule comprises if pattern errors have continually decreased during a predetermined count value of the predetermined time periods, a predetermined bonus acceleration parameter is to be used for calculating the updated learning rate; and
calculate the updated learning rate based on the base updated learning rate, the acceleration parameter and the bonus acceleration parameter.

16. The system according to claim 12, wherein the processor is further configured to calculate the initial learning rate according to the following equation:

$$\eta_0=2.24-0.086\ \sigma$$

wherein $\eta_0$ refers to the initial learning rate, and a refers to the standard deviation of the basic memory depth values in the machine failure sequence.

17. The system according to claim 12, wherein the processor is further configured to calculate the predetermined error threshold value according to the following equation:

$$Es=0.03-\sigma/1800$$

wherein Es refers to the error threshold value, and a refers to the standard deviation of the basic memory depth values in the machine failure sequence.

18. The system according to claim 12, wherein the processor is further configured to set initial weight values between input and hidden units in RNN as average values of weight values for a plurality of elementary sequences wherein each of the plurality of elementary sequences has a basic memory depth value included in the machine failure sequence.

* * * * *